US006278096B1

(12) United States Patent
Bass

(10) Patent No.: US 6,278,096 B1
(45) Date of Patent: Aug. 21, 2001

(54) FABRICATION AND REPAIR OF ELECTRICALLY INSULATED FLOWLINESS BY INDUCTION HEATING

(75) Inventor: Ronald M. Bass, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/629,378

(22) Filed: Aug. 1, 2000

Related U.S. Application Data
(60) Provisional application No. 60/147,018, filed on Aug. 3, 1999.

(51) Int. Cl.[7] .................................................. H05B 6/10
(52) U.S. Cl. ..................... 219/629; 219/633; 219/635; 156/274.2; 264/403; 264/486; 166/248
(58) Field of Search ........................ 219/629, 630, 219/633, 634, 635; 156/272.4, 274.2; 264/403, 472, 486, 487; 166/248, 61

(56) References Cited

U.S. PATENT DOCUMENTS

| 2,178,721 | * | 11/1939 | Daniels ................................. 219/629 |
| 2,224,403 | | 12/1940 | Lines ...................................... 219/39 |
| 2,306,831 | | 12/1942 | Proctor .................................. 219/39 |
| 2,806,931 | | 9/1957 | Akerlof ................................. 219/19 |
| 2,851,197 | | 9/1958 | Colton .................................. 222/146 |
| 3,238,346 | * | 3/1966 | Savko .................................... 219/633 |
| 3,483,374 | | 12/1969 | Erben ................................... 250/49.5 |
| 3,515,837 | | 6/1970 | Ando ................................... 219/10.49 |
| 3,549,943 | | 12/1970 | Church ................................. 315/111 |
| 3,604,893 | | 9/1971 | Horton ................................. 219/300 |
| 3,891,828 | | 6/1975 | De Corso ............................. 219/383 |
| 3,975,617 | | 8/1976 | Othmer ................................ 219/300 |
| 4,046,157 | * | 9/1977 | Cazalaa et al. ....................... 137/74 |
| 4,645,906 | | 2/1987 | Yagnik et al. ........................ 219/301 |
| 4,716,960 | | 1/1988 | Eastlund et al. ....................... 166/60 |
| 4,808,795 | | 2/1989 | Thörnblom ........................... 219/383 |
| 5,142,115 | | 8/1992 | Weidman et al. ................. 219/10.491 |
| 5,241,147 | * | 8/1993 | Ahlen .................................. 219/629 |
| 5,256,844 | * | 10/1993 | Grosvik et al. ..................... 219/629 |
| 5,289,561 | | 2/1994 | Filho ................................... 392/478 |
| 5,466,916 | * | 11/1995 | Iguchi et al. ......................... 219/633 |
| 5,786,575 | * | 7/1998 | Bleske et al. ........................ 219/633 |
| 5,960,644 | | 10/1999 | Nagelvoort et al. .................. 62/622 |
| 6,049,657 | * | 4/2000 | Sumner ............................... 392/469 |

FOREIGN PATENT DOCUMENTS

| 1 248 572 | 10/1971 | (GB) .................................... 213/210 |
| 0105343 | 8/1979 | (JP) .................................. H05B/7/06 |
| 0092000 | 6/1983 | (JP) .................................... 392/478 |
| 0932084 | 5/1982 | (RU) ................................... 392/478 |

* cited by examiner

Primary Examiner—Philip H. Leung

(57) ABSTRACT

A method of repairing the insulation of a subsea insulated pipeline which includes the use of an induction heating coil placed around the insulated pipe in the vicinity of an insulation defect. An electric current is provided to the induction heating coil which heats the pipe and melts the surrounding thermoplastic insulation, and thereby repairs and seals the insulation defect.

13 Claims, 9 Drawing Sheets

FABRICATION AND REPAIR OF ELECTRICALLY INSULATED FLOWLINESS BY INDUCTION HEATING

CROSS REFERENCE RELATED APPLICATIONS

This application claims the benefit of U.S. provisional application No. 60/147,018, filed Aug. 3, 1999.

BACKGROUND OF THE INVENTION

1. Field of the Invention

The present invention relates to methods for electrically heating subsea pipelines. More particularly, the invention relates to joining and repair of insulation on a single heated insulated pipe.

2. Description of the Related Art

Offshore hydrocarbon recovery operations are increasingly moving into deeper water and more remote locations. Often satellite wells are completed at the sea floor and are tied to remote platforms or other facilities through extended subsea pipelines. Some of these pipelines extend through water that is thousands of feet deep and where temperatures of the water near the sea floor are in the range of 40° F. The hydrocarbon fluids, usually produced along with some water, reach the sea floor at much higher temperatures, characteristic of depths thousands of feet below the sea floor. When the hydrocarbon fluids and any water present begin to cool, phenomena occur that may significantly affect flow of the fluids through the pipelines. Some crude oils become very viscous or deposit paraffin when the temperature of the oil drops, making the oil practically not flowable. Hydrocarbon gas under pressure combines with water at reduced temperatures to form a solid material, called a "hydrate." Hydrates can plug pipelines and the plugs are very difficult to remove. In deep water, conventional methods of depressuring the flow line to remove a hydrate plug may not be effective. Higher pressures in the line and uneven sea floor topography require excessive time and may create more operational problems and be costly in terms of lost production.

The problem of lower temperatures in subsea pipelines has been addressed by placing thermal insulation on the lines, but the length of some pipelines makes thermal insulation alone ineffective. Increased flow rate through the lines also helps to minimize temperature loss of the fluids, but flow rate varies and is determined by other factors. Problems of heat loss from a pipeline increase late in the life of a hydrocarbon reservoir because production rates often decline at that time. Problems become particularly acute when a pipeline must be shut-in for an extended period of time. This may occur, for example, because of work on the wells or on facilities receiving fluids from the pipeline or hurricane shut-downs. The cost of thermal insulation alone to prevent excessive cooling of the lines becomes prohibitive under these conditions.

Heating of pipelines by bundling the lines with a separate pipeline that can be heated by circulation of hot fluids has been long practiced in the industry. Also, heating by a variety of electrical methods has been known. Most of the proposals for electrical heating of pipelines have related to pipelines on land, but in recent years industry has investigated a variety of methods for electrical heating of subsea pipelines. ("Direct Impedance Heating of Deepwater Flowlines," OTC 11037, May, 1999).

Two configurations for heating have been considered. In one method of electrical heating, a pipe-in-pipe subsea pipeline is provided by which a flow line for transporting well fluids is the inner pipe and it is surrounded concentrically by and electrically insulated from an electrically conductive outer pipe until the two pipes are electrically connected at one end. Voltage is applied at the opposite end and electrical current flows along the exterior surface of the inner pipe and along the interior surface of the outer pipe. This pipe-in-pipe method of heating is disclosed, for example, in Ser. No. 08/625,428, filed Mar. 26, 1996, which is commonly assigned.

In a second configuration, a single flowline is electrically insulated and current flows along the flowline. This is called the "SHIP" system (Single Heated Insulated Pipe). Two SHIP systems have been considered: the fully insulated system, requiring complete electrical insulation of the flowline from the seawater, and the earthed-current system, requiring electrical connection with the seawater through anodes or other means. For both systems, current is passed through the flowline pipe.

An earthed-current system developed in Norway does not require the use of insulating joints or defect-free insulation, and hence avoids the problem of shorting by water and the effects of coating defects. ("Introduction to Direct Heating of Subsea Pipelines," overview by Statoil, Saga et al, February 1998). In that system, power is connected directly to the pipe at each end of a heated section and electrodes corrected to the pipe along the pipeline are exposed to seawater. This configuration allows current to flow in both the pipe and the seawater, therefore eliminating potential drop across the insulation on the pipe, so that a defect in the pipe insulation does not result in electrical failure. Since the heated section is not electrically isolated from the rest of the pipeline by insulation joints, some means must be provided to prevent current from flowing along the pipeline to areas where it may cause corrosion damage or interfere with control systems. This is accomplished by means of a buffer zone, which is a length of pipe approximately 50 meters in length between the power connection where current enters or leaves the pipeline and adjacent structures. In that design, the buffer zone may incorporate a series choke to further impeded leakage currents. This method requires that the return cable be as close to the pipe as possible, or electrical efficiency will be impractically low. This configuration is not practical for some deepwater applications and the system is considerably less energy-efficient than a fully insulated system.

A fully insulated method of electrically heating a pipeline is disclosed in U.S. Pat. No. 6,049,657. In this method, an electrically insulated coating covers a single pipeline carrying fluids from a well. An alternating current is fed to one end of the pipeline through a first insulating joint near the source of electrical current and the current is grounded to seawater at the opposite end of the pipe to be heated through a second insulating joint.

The SHIP method of electrical heating of pipelines offers many advantages, but suffers from the significant disadvantage that any defects in the insulation would allow seawater to reach the pipe, which would accelerate corrosion of the pipe. Therefore, there is a need for methods for fabricating and repairing thermoplastic layers of insulation, especially at field joints where sections of pipe are welded together, so that the pipe can be joined and the insulation be maintained defect-free.

SUMMARY OF THE INVENTION

In one embodiment, thermoplastic electrical insulation placed at the junction of two joints of insulated pipe during the field installation of the pipe is melted by inductively heating the pipe. The melted insulation flows to form defect-free insulation at the field junction before the pipe is placed subsea. In another embodiment, electrical insulation on installed subsea pipelines is repaired by inductively heating the pipe to melt the thermoplastic insulation, which flows to eliminate defects. In both these embodiments, an induction heating coil is placed around the exterior of the thermoplastic insulation in the vicinity of a junction or defect in the electrical insulation. An electric current is provided to the induction heating coil for a selected time to cause the pipe to heat in the vicinity of the junction or defect. The heated pipe causes the thermoplastic insulation to melt or become flowable. Upon solidification, the plastic has flowed together or into the defect.

BRIEF DESCRIPTION OF THE DRAWINGS

A better understanding of the invention can be obtained when the detailed description of exemplary embodiments set forth below is considered in conjunction with the attached drawings in which.

DETAILED DESCRIPTION OF THE EXEMPLARY EMBODIMENTS

Figure 1:
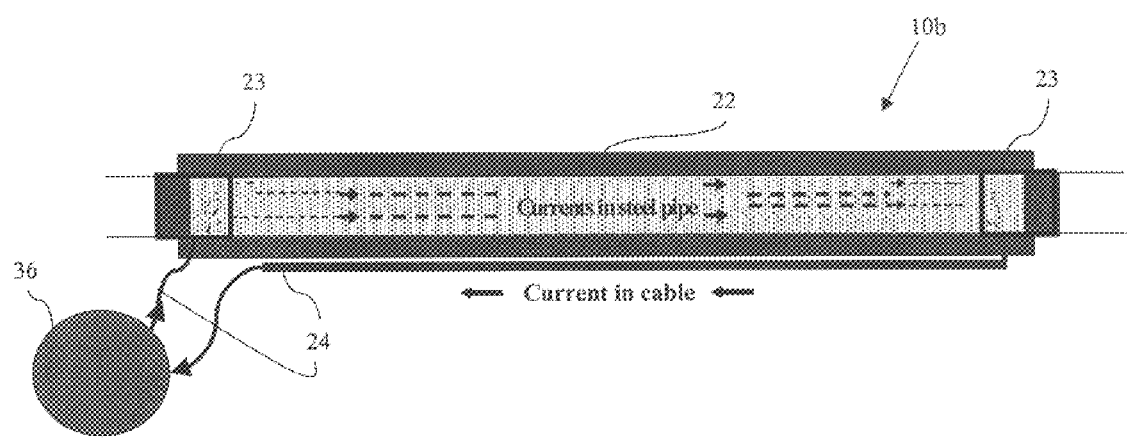
FIG. 1 illustrates a prior art direct electrical heating of a single heated insulated pipe having two flowline insulating joints and a cable return of electrical current.

Referring to FIG. 1, the concept of a single heated insulated pipe is illustrated. A segment of electrically heated pipeline is shown generally at 10b. Alternating current (AC) power supply 36, commonly supplying 60 Hz electrical power, may be used to supply the electrical power. Other frequencies may be selected. Pipe electrical insulation 22 prevents current flow between the steel walls of the pipeline and surrounding seawater. Insulating joints 23 connect to the ends of segment 10b of a pipe that is to be heated and serve to electrically insulate segment 10b from the adjoining segments of the pipeline. Electrical current flows from a first insulating joint through the steel wall of the pipeline to a second insulating joint and is then returned through cable 24 to power supply 36, thus completing the electrical circuit.

Figure 2:
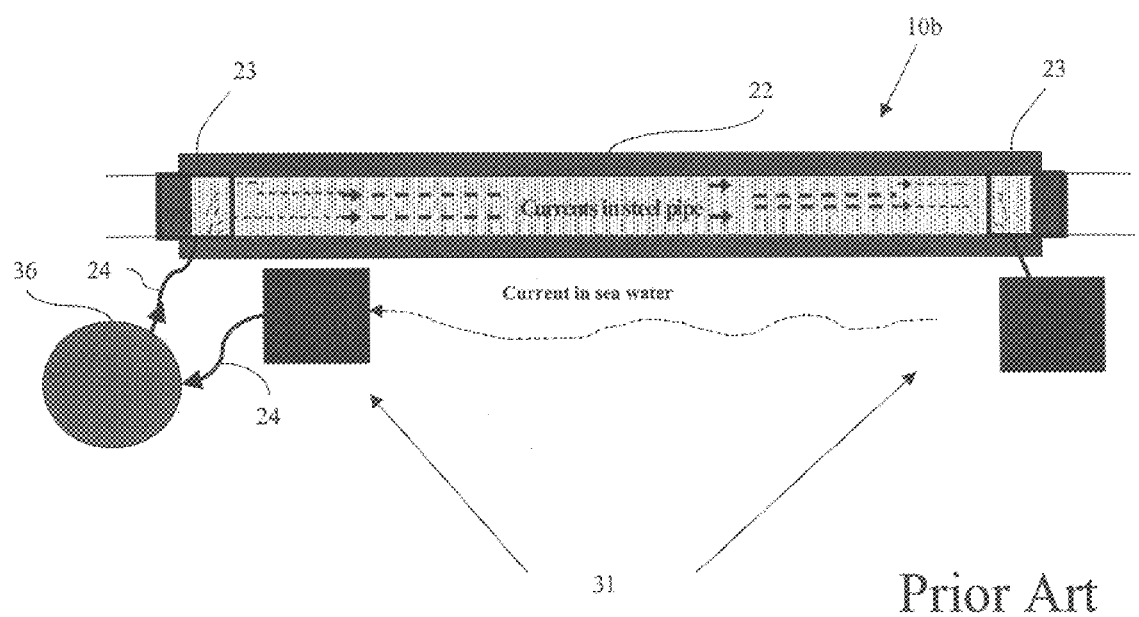
FIG. 2 illustrates a prior art direct electrical heating of a single heated insulated pipe having two flowlines insulating joints and seawater return of electrical current.

FIG. 2 illustrates a similar configuration to that shown in FIG. 1 except the return current between insulating joints 23 is now through seawater. Seawater electrodes 31 allow current to flow between insulating joints and seawater. Cables 24 connect the AC power supply to a first insulating joint 23 and to a seawater electrode. Such seawater electrodes and insulating joints are known in the subsea pipeline industry and are used for such purposes as corrosion control. The seawater then serves to conduct return current in place of a portion of electrical cable 24 as shown in FIG. 1. Flowline insulating joints such as joints 23 have been used in offshore corrosion protection systems, but normally with low voltage and current ratings and without an external electrical connection introducing electrical current between the insulating joints. The methods of this invention may be used to form or repair thermoplastic insulation on pipe used in any configuration for electrically heating insulated pipelines.

Figure 3:
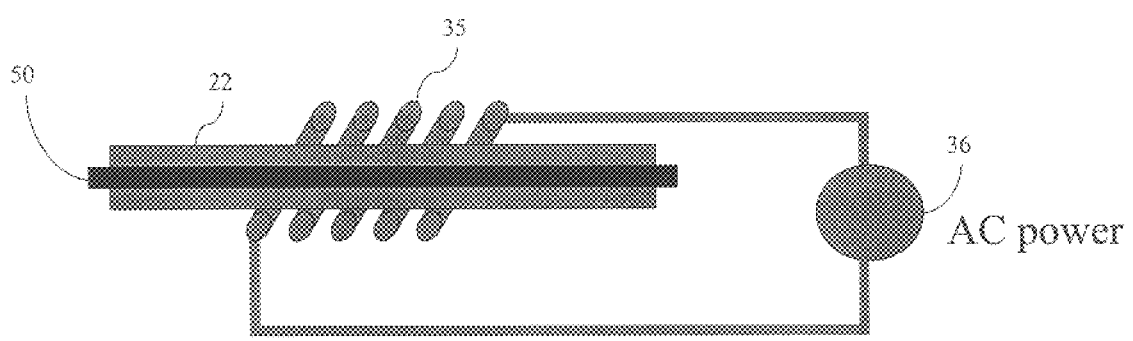
FIG. 3 shows use of induction heating to fabricate or repair thermoplastic coating on single pipe systems, for application either during construction or after laying.

The concept of using inductive heating to fabricate or repair thermoplastic insulation is illustrated in FIG. 3. Induction heating coil 35 is placed around pipe 50 where thermoplastic insulation is to be fabricated or repaired. During fabrication, thermoplastic insulation may be placed over the pipe joints formed during pipe-laying operations but the newly-placed thermoplastic may not be properly joined to pre-fabricated layers of insulation on the pipe to produce a defect-free coating. Or, repair may be necessary where an insulation defect is present after the pipe has been placed subsea. Alternating current from power source 36 is passed through the induction heating coil 35, causing heating of pipe 50. With sufficient heating of the pipe, thermoplastic insulation 22 is melted outward from the surface of pipe 50, causing the thermoplastic to flow together with prefabricated thermoplastic or to flow into a defect. Thermoplastic insulation 22 should be melted outward from the pipe 50 surface an effective distance to allow the plastic to flow together or into a defect. The effective distance will depend on the location and size of a defect. A melt zone of ¼ to ½ inch outward from the pipe surface will typically be sufficient to repair a defect and restore integrity to the insulation layer. The thickness of the melt zone can be controlled by the amount of applied power and the time period the power is applied.

FIGS. 4–8 show the steps in forming a defect-free insulation layer over a junction between joints of insulated pipe before the pipe is placed subsea. A junction in the pipe will ordinarily be formed on a lay barge by welding the joints of pipe, forming what is called a "field joint." In some cases field joints are prepared onshore and a length of many joints of welded pipe is reeled onto a large drum for laying.

Figure 4:
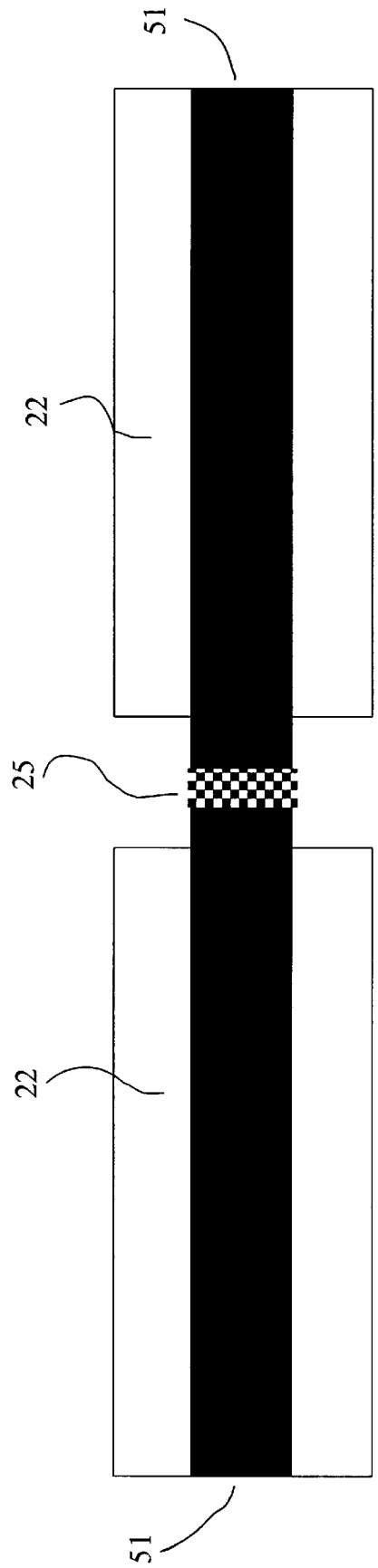
FIG. 4 shows two sections of insulated pipe where the pipe has been welded together.

FIG. 4 shows two joints of pipe 51, with each joint having prefabricated or pre-installed insulation 22. The insulation is a thermoplastic, preferably polyethylene or polypropylene. The joints of pipe have been connected with weld 25. Insulation 22 preferably does not extend all the way to the end of the pipe 51, but leaves a gap such that the insulation is not damaged during welding. Alternatively, if a mechanical connection is used the insulation is placed to allow joining of the connection. Preferably, the insulation layer on each joint of pipe is beveled (not shown) to provide a clean surface that is easy to heat with radiant heaters. The beveled surface is then heated until the thermoplastic insulation is tacky, but not runny. The radiant heaters are sized and positioned to accomplish this in the least practical time while maintaining uniform heating across the beveled face.

Figure 5:
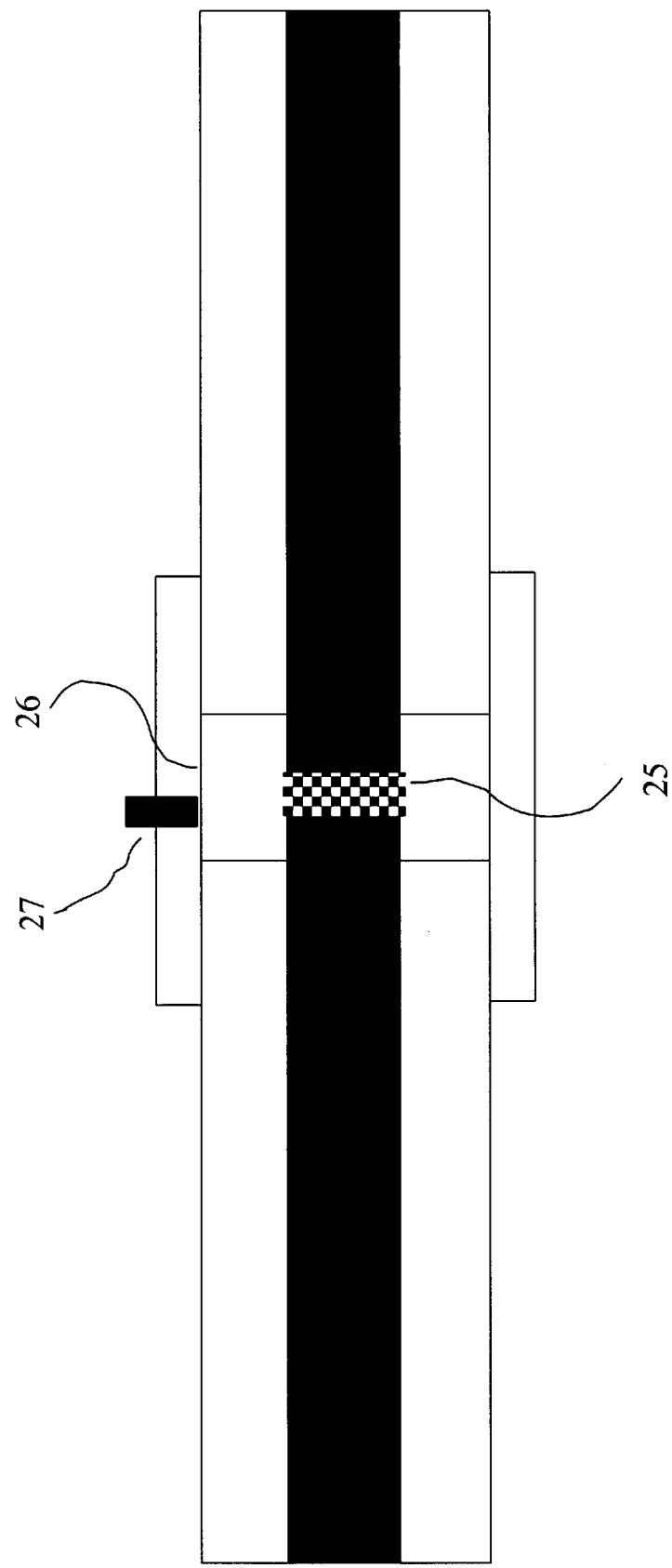
FIG. 5 shows a mold placed around the field joint of FIG. 4.
Figure 6:
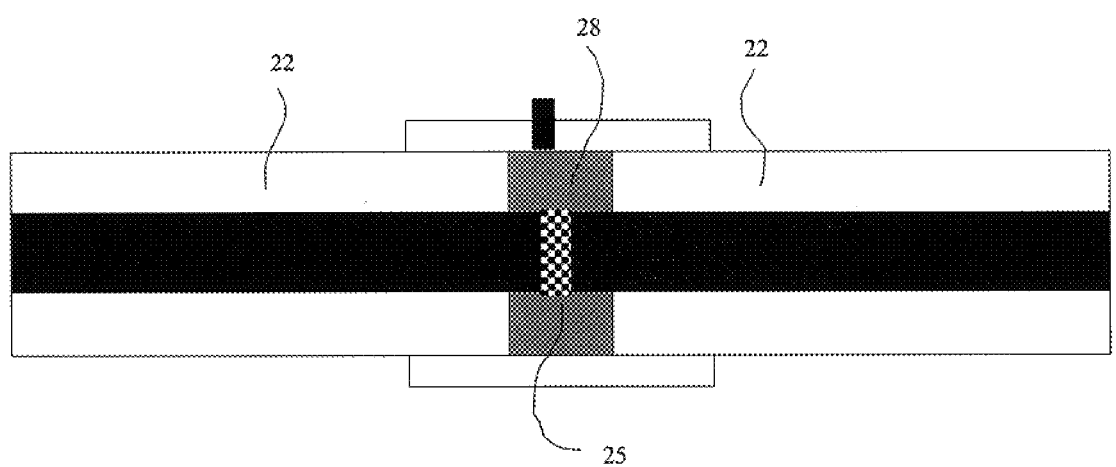
FIG. 6 shows a thermoplastic injected into the mold of FIG. 5.

FIG. 5 shows mold 26 placed around the area of weld 25. Mold 26 is preferably constructed from sheet metal having low magnetic permeability, such as stainless steel or aluminum. These metals allow induction heating coils to heat the pipe 51 rather than mold 26. Mold 26 includes injection nozzle 27 for injecting a thermoplastic material into the mold-cavity, which is the volume inside the mold and around the pipe, as shown in FIG. 6. Thermoplastic 28 fills the mold-cavity between the two sections of insulation 22 in the area around weld 25.

Figure 7:
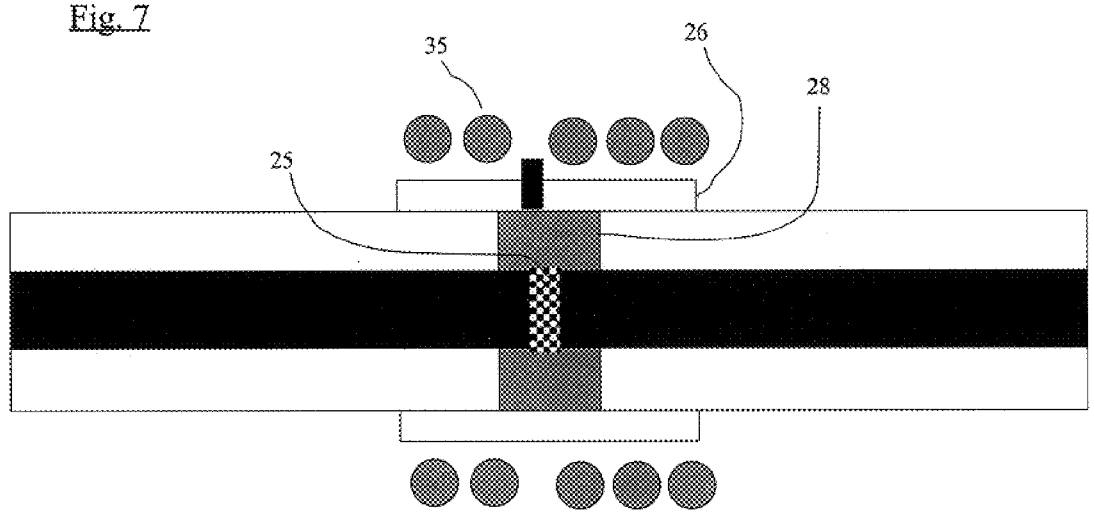
FIG. 7 shows an induction heating coil placed around the mold with thermoplastic therein of FIG. 6.
Figure 8:
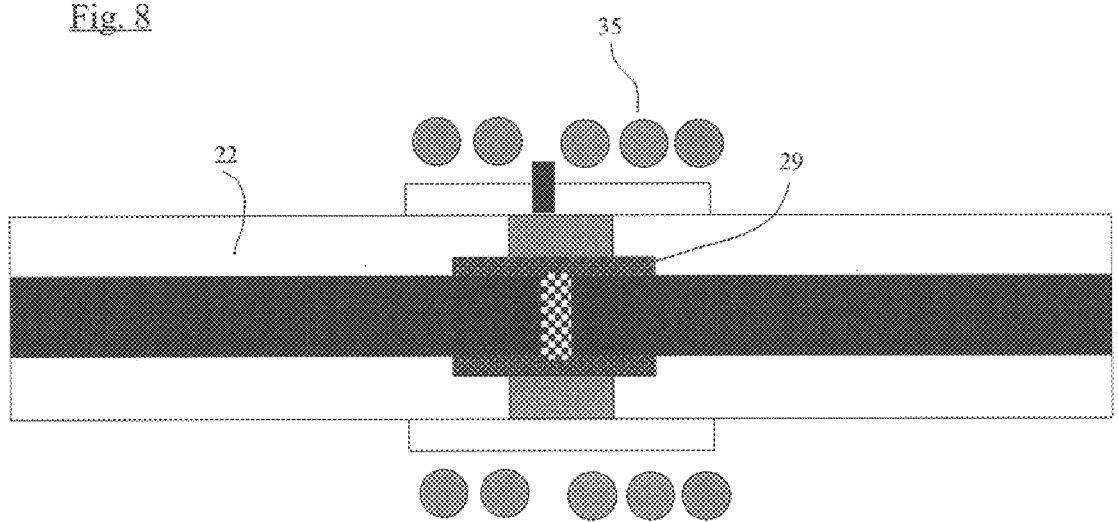
FIG. 8 shows a melt zone produced by the induction heating coil.

FIG. 7 shows induction heating coil 35 placed about mold 26. An electric current may be supplied to induction heating coil 35 from AC power source 36 (FIG. 3) to cause heating of pipe 51. As shown in FIG. 8, this in turn causes melt zone 29 to be formed around the area of weld 25. Preferably, melt zone 29 encompass both thermoplastic 28 that had been injected into mold 26 as well as the thermoplastic in pre-fabricated insulation 22. As the described method is typically performed on a lay barge, it is preferred that induction heating coil 35 and the electrical current utilized be designed to provide sufficient heating to form melt zone 29 in a short period of time. Preferably, this time is less than about 10 minutes, since this time will not ordinarily significantly delay the pipe-laying operations. Upon solidification of melt zone 29, defects in the insulation around weld 25 are prevented.

Alternatively, induction heating may be applied after mold 26 is removed. Typically, a skin forms under the mold within a few minutes after the thermoplastic is injected. Once this skin forms, the mold can be removed and coil 35 clamped around the pipe. This eliminates the need to make the mold out of a special material to allow induction heating.

Figure 9:
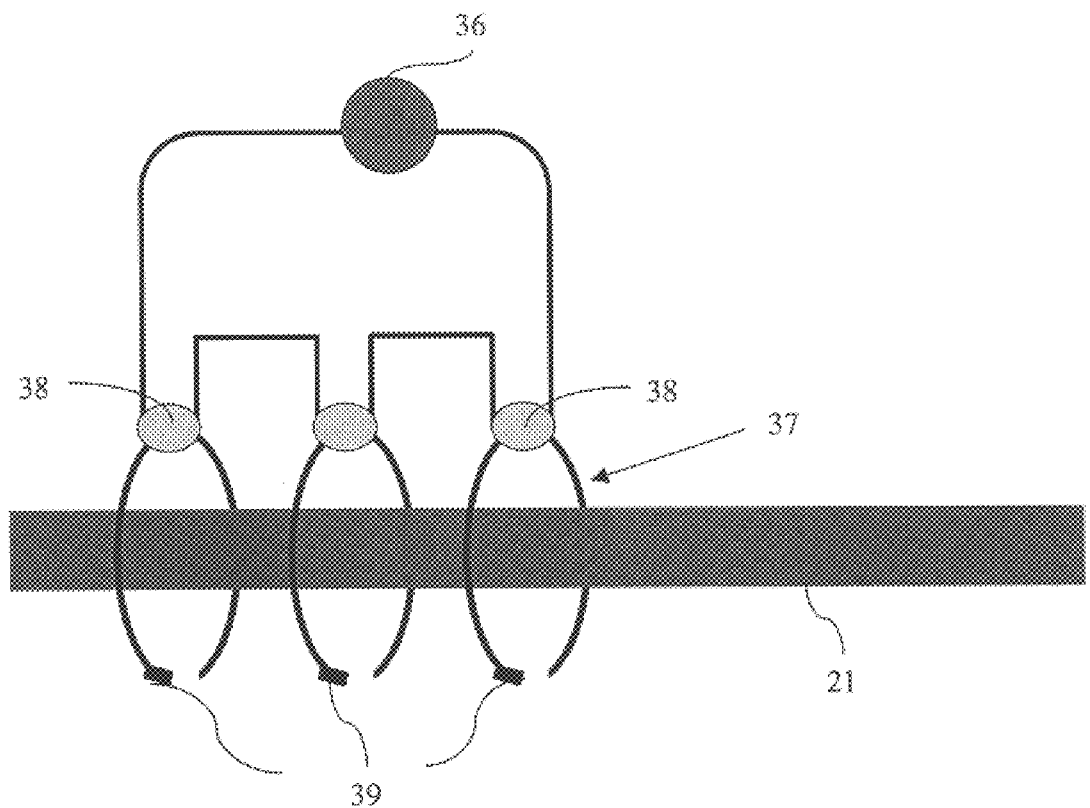
FIG. 9 shows a diagram of an induction heating coil clamp.

To repair insulation defects in pipeline that has already been laid on the sea floor, where the induction coil 35 of FIG. 3 will normally not be present, a Remotely Operated Vehicle (ROV) may be used to apply an induction heating coil around the pipeline. FIG. 9 shows such coil 37 that maybe placed around a pipeline in the form of a clamp. Induction heating coil clamp 37 includes insulating hinge 38 that allows the clamp to be placed around a pipeline. It may be necessary for the ROV to jet material from under the pipeline to make room for the clamp to connect below the pipeline. The individual coils of the induction heating coil clamp may be connected via pluggable wet-mateable connectors 39. Alternatively, a cable may be wrapped around the pipeline over the segment to be heated using an ROV. Here, the electric current to the induction heating coil clamp 37 or to the cable may be supplied by the ROV or by a surface source. Also, the ROV may move clamp 37 along multiple segments of pipeline where insulation defects are suspected. Induction heating coil clamp 37 as described is known in industry, but not for subsea use as disclosed here. In fusion bonded epoxy (FBE) coating of pipe, for example, an induction heating coil clamp is used to heat the pipe before the epoxy is sprayed on the surface of the pipe.

Various methods may be used to locate an insulation defect in a subsea pipeline. Hydrogen or oxygen bubbles resulting from the electrolysis of seawater may be viewed by television or detected by the sound they emit. The leakage current may be located by running voltmeters or magnetometers along the pipe. Also, Time Domain Reflectometry (TDR) may be used to detect where current is leaking due to a defect in the insulation.

Generally, three types of insulation defects have been observed:

(1) the pre-fabricated coating disbonds from the pipe where it terminates (before the thermoplastic is injected around the field joint). This limits the maximum voltage since the gas gap formed by the disbanding is the first place to break down as voltage is increased.

(2) air bubbles form in the molded field joint. This causes the same problem as the disbonding but at somewhat higher voltages.

(3) the face between the pipe coating and the molded field joint forms a weak bond.

This can happen if the face on the end of the pipe coating is not properly preheated before the mold is poured. This is a very significant defect because it causes a direct fault to the seawater. This defect may be minimized by cutting the face to a bevel before molding to provide a clean surface that is easy to heat with radiant heaters.

EXAMPLE

A section of 4 inch ID and 5½ inch OD pipe was insulated using a 2½ inch-thick layer of high grade polyethylene. Then a ¼ thick polyethylene jacket was added. Several ⅛ inch-diameter holes in the insulation were drilled to the surface of the metal. The pipe was then heated to 525° F. using induction heating to form a melt zone near the pipe surface. This melting and later resolidification of the melt zone sealed the ⅛ inch holes and provided for electrical integrity of the electrical insulation.

U. S. Provisional Application No. 60/147,018, filed Aug. 3, 1999, is hereby incorporated by reference herein.

Having described the invention above, various modifications of the techniques, procedures, material, and equipment will be apparent to those skilled in the art. It is intended that all such variations within the scope and spirit of the invention be included within the scope of the appended claims.

What is claimed is:

1. A method for providing electrical insulation over a field joint in a single heated insulated pipeline for subsea application, comprising:
    (a) providing joints of pipe, the joints having ends and a prefabricated layer of thermoplastic insulation;
    (b) welding two joints of the pipe to form a weld area between the joints;
    (c) placing a mold made from a material having low magnetic permeability around the weld area to form a mold cavity;
    (d) injecting a thermoplastic into the mold cavity;
    (e) placing an induction heating coil around the field joint; and
    (f) providing a selected amount of electric current to the induction heating coil for a selected time to heat the pipe in the vicinity of the weld area such that the thermoplastic becomes flowable for an effective distance from the pipe.

2. The method of claim 1 further comprising the step of removing the mold before the step of placing an induction heating coil around the field joint.

3. The method of claim 1 further comprising the step of removing the induction heating coil after step (f).

4. The method of claim 1 wherein the mold is made from sheet metal.

5. The method of claim 4 wherein the sheet metal is stainless steel or aluminum.

6. The method of claim 1 wherein the thermoplastic is primarily polypropylene.

7. The method of claim 1 wherein the thermoplastic is primarily polyethylene.

8. The method of claim 1 wherein the selected electric current provided to the induction heating coil and the selected time are effective to form a melt zone extending from the thermoplastic injected into the mold cavity into the prefabricated layer of thermoplastic.

9. A method for providing electrical insulation over a field joint in a single heated insulated pipeline for subsea application, comprising:

(a) providing joints of pipe, the joints having ends and a prefabricated layer of thermoplastic insulation;

(b) welding two joints of the pipe to form a weld area between the joints;

(c) placing a mold around the weld area to form a mold cavity;

(d) injecting a thermoplastic into the mold cavity;

(e) removing the mold around the weld area;

(f) placing an induction heating coil around the field joint; and (g) providing a selected amount of electric current to the induction heating coil for a selected time to heat the pipe in the vicinity of the weld area such that the thermoplastic becomes flowable for an effective distance from the pipe.

10. The method of claim 9 further comprising the step of removing the induction heating coil after step (g).

11. The method of claim 9 wherein the thermoplastic is primarily polypropylene.

12. The method of claim 9 wherein the thermoplastic is primarily polyethylene.

13. The method of claim 9 wherein the selected electric current provided to the induction heating coil and the selected time are effective to form a melt zone extending from the thermoplastic injected into the mold cavity into the prefabricated layer of thermoplastic.

* * * * *